(12) United States Patent
Yokoyama et al.

(10) Patent No.: US 7,123,607 B2
(45) Date of Patent: Oct. 17, 2006

(54) QUALITY CONTROL DEVICE FOR VOICE PACKET COMMUNICATIONS

(75) Inventors: Atsushi Yokoyama, Saitama (JP); Hiromi Aoyagi, Kanagawa (JP); Nobuyuki Yamaguchi, Saitama (JP); Kazuyoshi Akie, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 832 days.

(21) Appl. No.: 09/974,827

(22) Filed: Oct. 12, 2001

(65) Prior Publication Data

US 2002/0064158 A1 May 30, 2002

(30) Foreign Application Priority Data

Nov. 27, 2000 (JP) .............................. 2000-358779

(51) Int. Cl.
*H04L 12/66* (2006.01)
(52) U.S. Cl. ...................... 370/352; 370/429; 370/235
(58) Field of Classification Search ................ 370/516, 370/346, 235, 493, 352, 285, 517, 230, 356, 370/443; 375/326, 324, 354; 704/219, 220, 704/222; 709/214, 231
See application file for complete search history.

(56) References Cited

U.S. PATENT DOCUMENTS

| | | | |
|---|---|---|---|
| 5,732,134 A * | 3/1998 | Sih ........................ 379/406.13 |
| 6,049,606 A * | 4/2000 | Ding et al. ............. 379/406.08 |
| 6,192,126 B1 * | 2/2001 | Koski ..................... 379/406.14 |
| 6,219,339 B1 * | 4/2001 | Doshi et al. ................. 370/235 |
| 6,434,606 B1 * | 8/2002 | Borella et al. .............. 709/214 |
| 6,504,838 B1 * | 1/2003 | Kwan .......................... 370/352 |
| 6,549,587 B1 * | 4/2003 | Li .............................. 375/326 |
| 6,604,070 B1 * | 8/2003 | Gao et al. .................... 704/222 |
| 6,658,027 B1 * | 12/2003 | Kramer et al. .............. 370/516 |
| 6,765,931 B1 * | 7/2004 | Rabenko et al. ............ 370/493 |
| 6,823,303 B1 * | 11/2004 | Su et al. ..................... 704/220 |
| 6,829,244 B1 * | 12/2004 | Wildfeuer et al. .......... 370/412 |

* cited by examiner

*Primary Examiner*—Ricky Q. Ngo
*Assistant Examiner*—Andrew C. Lee
(74) *Attorney, Agent, or Firm*—Venable LLP; Michael A. Sartori; Kavita B. Lepping

(57) ABSTRACT

A quality control device which improves the quality of voice packet communication. The quality control device used for voice packet communications for transmitting voice packets through a quality non-asurance type network includes a buffer memory for temporarily storing voice packets received through the network and forming a queue of the received voice packets, a queue operating device for operating the queue in accordance with an operation control signal to be supplied, a sequence examining device for examining vocal properties of a sequence of voice information contained in a plurality of voice packets that constitute the queue stored in the buffer memory, and an operation control device for changing the operation control signal in accordance with an examination result of the sequence examining means.

3 Claims, 11 Drawing Sheets

QUALITY CONTROL DEVICE FOR VOICE PACKET COMMUNICATIONS

BACKGROUND OF THE INVENTION

1. Field of the Invention

The present invention relates to a quality control device for voice packet communications that uses a packet network of, for example, the Internet.

2. Description of Related Art

Recently, techniques are been proposed for transmitting a voice signal in real time through a packet network of, for example, the Internet, and devices therefor are being introduced for actual use.

However, the Internet was originally developed for data communications that do not require real time transmission, and the packet transmission on the Internet is not guaranteed qualitatively. Therefore, there is the possibility that phenomena, such as packet-lacking (packet loss), delay, and jitter, that deteriorate a decoded voice will occur on the Internet.

Therefore, if the Internet is used for a communications function, such as telephone communications, that require real-time responsiveness, a buffer device is needed to prevent transmission intermittence.

Let us assume that this buffer device stores voice packets (note that these voice packets include encoded voice data compressed according to an irreversible compressing/encoding method in many cases), which have been received from a network, for example, the Internet, in the order of reception, and reads them in the order of storage. In this case, the reading is always and repeatedly carried out at intervals of a fixed decoding unit time that is required by a decoding circuit that decodes (decompresses) the encoded voice data.

Therefore, in a case where this buffer device is used, if the arrival of a voice packet at a receiver is delayed for more than the fixed time because of, for example, the influence of jitter, the voice packet is not stored onto the buffer device, and only the reading continues, and, as a result, voice packets to be read out will be exhausted.

Since there is a need to keep voice packets being supplied to the decoding circuit at the intervals of the decoding unit time even when such exhaustion occurs, a technique for inserting a complementary packet that contains predetermined voice data (in many cases, this is voice data that generates a slight noise near voice-absence as a decoded voice) is generally used in this case.

However, when the complementary packet is inserted, a packet whose arrival has been delayed by the above-mentioned jitter is sent later. Therefore, disadvantageously, the number of packets in the buffer device gradually increases, and a transmission delay is lengthened with the lapse of time.

If the transmission delay becomes long, the response to the contents of speech, for example, in a bidirectional conversational voice will be unnaturally delayed, and the quality of communication will fall.

A possible countermeasure against this is to at first delete (discard) the voice packet that has been stored in the buffer device (i.e., voice packet that occupies the top position) when the number of stored voice packets exceeds a predetermined number.

Another possible countermeasure is that a position where the complementary packet is inserted is fixed at this top position when the arrival of a voice packet is delayed for more than a fixed time, and voice packets to be read out are exhausted.

However, if the complementary packet is inserted or the voice packet is deleted at only about the top position in this way, an advantage of being able to simplify the processing can be obtained, but, only the state of the top position (i.e., state of the voice packet that has been read out prior to that) can be monitored. Therefore, as a result, the possibility that such deletion and insertion will be successively carried out for a specific position on a series of voice packets increases.

If deleted, effective voice data needed when decoded will be lost, and, if inserted, unnecessary voice data will be mixed when decoded. Therefore, these are operations that deteriorate the quality of decoded voice output, and, if the deletion or insertion is successively carried out from or onto the series of voice packets, the possibility that the degree of deterioration will become significant is high.

OBJECTS AND SUMMARY OF THE INVENTION

To solve the problem, the present invention is characterized in that a quality control device for voice packet communications for transmitting voice packets through a quality non-assurance type network comprises (1) a buffer memory for temporarily storing voice packets received through the network and forming a queue of the received voice packets, (2) a queue operating means for operating the queue in accordance with an operation control signal to be supplied, (3) a sequence examining means for examining vocal properties of a sequence of voice information contained in a plurality of voice packets that constitute the queue stored in the buffer memory, and (4) an operation control means for changing the operation control signal in accordance with an examination result of the sequence examining means.

DETAILED DESCRIPTION OF THE PREFERRED EMBODIMENTS

(A) Embodiments

A description will be hereinafter given of embodiments in a case where a quality control device for voice packet communications according to the present invention is applied to a voice communications device disposed on the Internet.

This voice communications device corresponds to, for example, VoIP (Voice Over IP), in which conversational voices are exchanged bi-directionally or mono-directionally through the Internet. As one example, the voice communications device may be an Internet phone.

(A-1) Structure of First Embodiment

Figure 1:
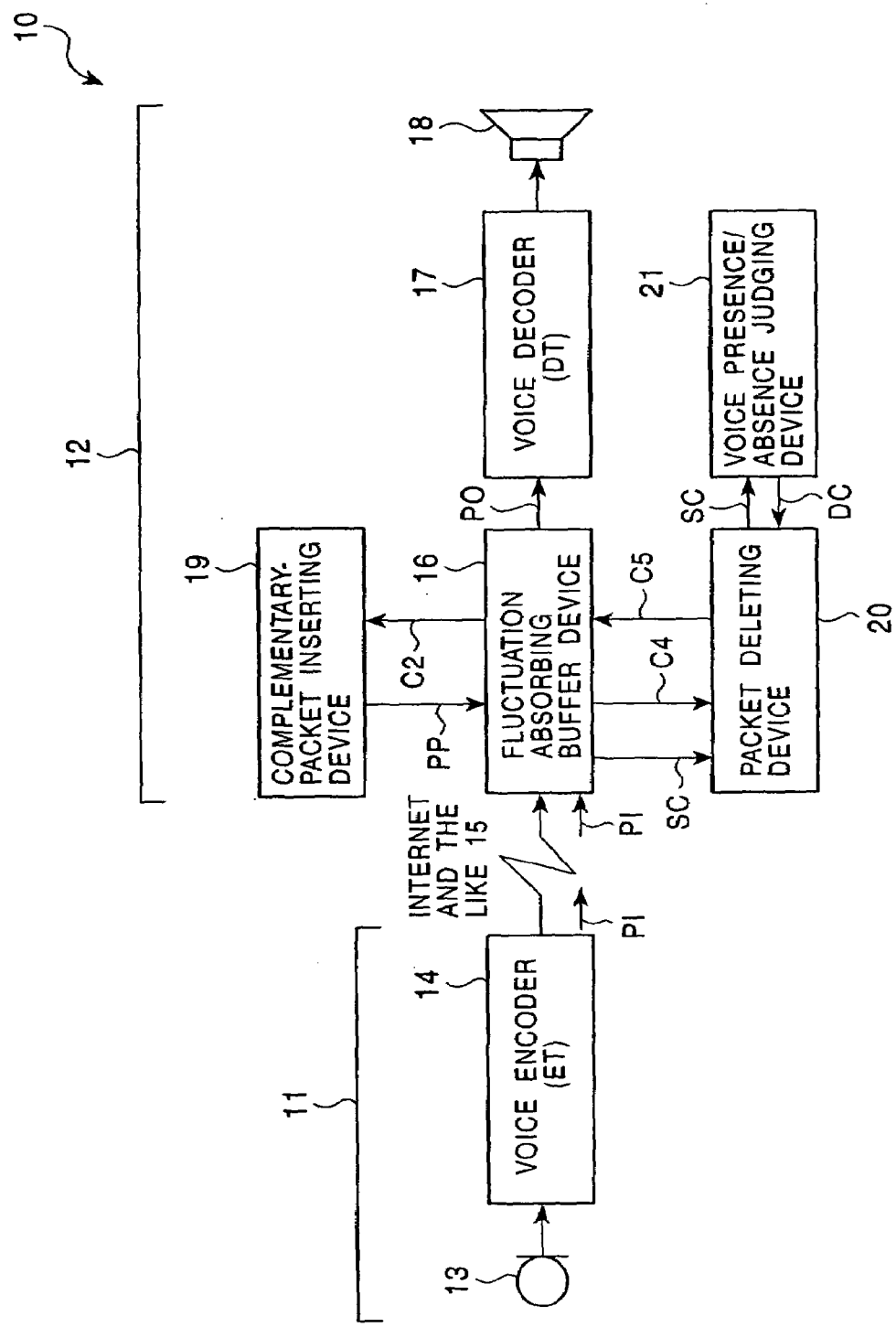
FIG. 1 is a schematic diagram that shows a structure of a principal part of a voice communications system according to a first embodiment.

A structure of a principal part of a voice communications system 10 that includes a voice communications device 12 of this embodiment is shown in FIG. 1.

In FIG. 1, the voice communications system 10 includes a voice communications device 11, a network 15, and a voice communications device 12.

In FIG. 1, the voice communications device 11 functions as a sending side, and the voice communications device 12 functions as a receiving side. The voice communications device 11 may be a communications device used exclusively for transmission, and the voice communications device 12 may be a communications device used exclusively for reception. Of course, they may be each transmitting/receiving device provided with functions of both transmission and reception. The structure and operation of the transmitting/receiving device can be obtained merely by replacing the voice communications devices 11 and 12 with each other and combining them in FIG. 1. Therefore, a description will be hereinafter given of only the case where the voice communications device 11 functions as the sending side whereas the voice communications device 12 functions as the receiving side.

The network 15 where the voice communications devices 11 and 12 are connected is the Internet in this embodiment though any network can be employed if it is a network used for quality non-assurance packet communications like the Internet.

The voice communications device 11 serving as the sending side includes a microphone 13 and a voice encoder 14.

Herein, the voice encoder 14 functions to encode (irreversibly compress and encode) voice data to be gathered and sent from the microphone 13 so as to send the voice data to the Internet 15, thereafter divide encoded voice data for each fixed-encoding-unit-time and contain the data in a voice packet PI, and sequentially send it to the Internet 15.

In the irreversible compression method, there is the possibility that data loss (for example, loss at the bit level) will occur. By this compression, data storage is reduced to, for example, about one several tenth to one several hundredth (in the lossless compression method, it is reduced to, for example, about one second to one ninth). The voice data is to be finally perceived by the auditory organs of a person, such as a user of the packet communications device 12. Therefore, even if the data is not strictly reconstructed into the original state in which it is not compressed, and even if a part of the data is lost, there is no problem if it is in an allowable limit. Therefore, for example, from viewpoint of the improvement in the real-time responsiveness of communication, it is advantageous to reduce the data size by high compressibility and carry out irreversible compression that is convenient for improving substantial transmission efficiency rather than to seek accuracy of the data obtained by decompression.

The encoding unit time ET of the voice encoder 14 is usually caused to coincide with the decoding unit time DT of a voice decoder 17 described later. For example, concerning the decoding unit time DT, DT=10 milliseconds in G.729 of ITU-T standards, and DT=30 milliseconds in G.723.1. Generally, the encoding unit time ET is caused to coincide with either of the two.

In this embodiment, DT=10 milliseconds. In this case, the length of the voice packet PI can be regarded as being substantially 10 milliseconds.

The voice communications device 12 that receives time-series voice packets PI, which the voice communications device 11 has sent, through the Internet 15 includes a fluctuation absorbing buffer device 16 (hereinafter referred to simply as "buffer device" 16), the voice decoder 17, a speaker 18, a complementary-packet inserting device 19, a packet deleting device 20, and a voice presence/absence judging device 21.

The buffer device 16 among these elements chiefly comprises a buffer memory 32 that functions to absorb a transmission differential delay (transmission delay fluctuation, i.e., jitter) of voice packets PI generated on the Internet 15. An example of its structure is shown in FIG. 2.

(A-1-1) Internal Structure of the Fluctuation-Absorbing Buffer Device

Figure 2:
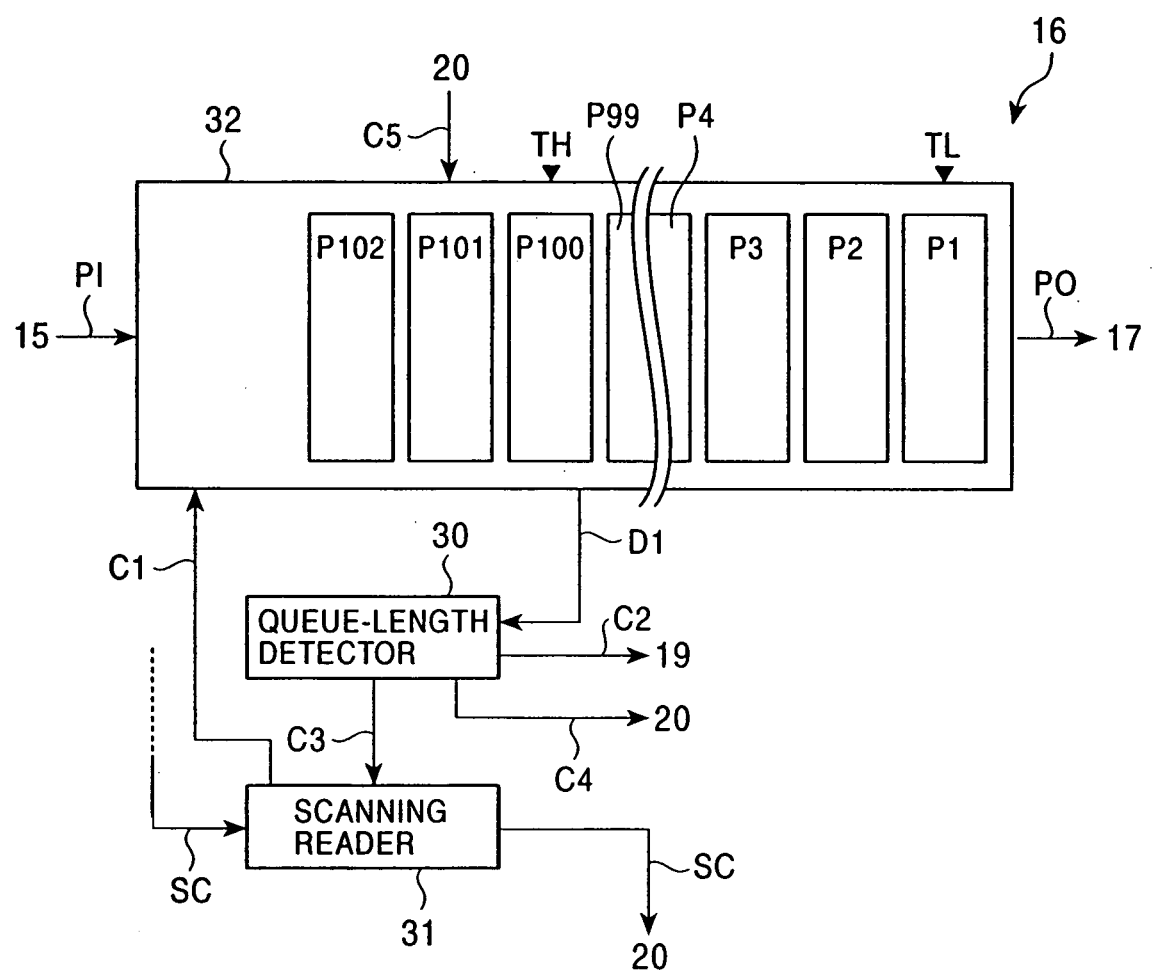
FIG. 2 is a schematic diagram that shows a structure of a buffer device of the first embodiment.

In FIG. 2, the buffer device 16 includes a queue length detector 30, a scanning reader 31, and the buffer memory 32.

The buffer memory 32 basically functions as a FIFO memory (first-in first-out type memory). Time-series voice packets PI that have been received from the Internet 15 are written to the buffer memory 32 in the order of receipt, and are read from the buffer memory 32 in the order of writing. The voice packets PI that have been read out are supplied to the voice decoder 17 as voice packets PO.

The reading is always repeatedly carried out at intervals of the fixed decoding unit time, whereas the writing is influenced by packet loss, jitter, etc., on the Internet 15 and does not necessarily assure that it will be carried out at intervals of fixed time. That is because the frequency or level of loss or jitter changes hourly depending on, for example, a change in the traffic of Internet 15.

Among the sequences of the received voice packets PI, the voice packet written initially to the buffer memory 32 in a state of FIG. 2 is a voice packet P1, the voice packet written secondly is a voice packet P2, the voice packet written thirdly is a voice packet P3, the voice packet written fourthly is a voice packet P4, . . . , the voice packet written 100thly is a voice packet P100, the voice packet written 101stly is a voice packet P101, and the voice packet written lastly is a voice packet P102.

In this state, 102 voice packets P1 are stored in the buffer memory 32. The queue length can be expressed as 102 packets if expressed by the number of packets, and the time of decoded voice output can be expressed as 1.02 seconds (=102.times.0 milliseconds) if expressed by time.

Therefore, in FIG. 2, the rightmost voice packet is the earliest in the time of writing and reading, and the leftmost voice packet is the latest in writing and reading. A blank part at the left in the buffer memory 32 corresponds to a buffer area where a voice packet has not yet been written at that time though it is in a state of being able to write a voice packet.

In this embodiment, two thresholds TH and TL of higher and lower ones are set in the buffer memory 32. The lower threshold TL is set at a position that corresponds to the top position described in the problem that the invention intends to solve, i.e., at a position that corresponds to the intermediate queue length between the 1-packet and 0-packet.

On a basis of a lower threshold TL, it is detected that the queue length has reached a state of not being one packet in the present reading and that nonexistence of a packet to be read, i.e., exhaustion (of voice packets) has occurred in the next reading after the lapse of the decoding unit time.

The higher threshold TH is set at a position that corresponds to the intermediate queue length between the 100th packet and the 99th packet, for example. The position of the higher threshold TH can be statically changed upward or downward if necessary.

The queue length detector 30 that monitors the relationship between the queue length in the buffer memory 32 and the two thresholds TH and TL is disposed between the buffer memory 32, the complementary-packet inserting device 19, and the packet deleting device 20. When the queue length becomes shorter than the lower threshold TL, the queue length detector 30 causes the complementary-packet inserting device 19 to insert a complementary packet PP into the top position, and, when the queue length becomes longer than the higher threshold TH, the queue length detector 30 causes the packet deleting device 20 to delete a voice packet from an appropriate position on the queue.

Therefore, the queue length detector 32 detects a queue length by the use of a detection signal D1 supplied from the buffer memory 32, and switches a control signal C2 supplied to the complementary-packet inserting device 19 from an inactive state to an active state, thereby instructing the complementary-packet inserting device 19 to insert the complementary packet PP. Likewise, the queue length detector 32 switches a control signal C4 supplied to the packet deleting device 20 from an inactive state to an active state, thereby instructing the packet deleting device 20 to delete the voice packet.

As a concrete example of the detection signal D1, it can be mentioned that use is made of a difference obtained by subtracting the number of times of reading of voice packets PI (PO) from the number of times of writing of voice packets PI onto the buffer memory 32.

This queue length detector 30 also switches a control signal C3 supplied to the scanning reader 31 from an inactive state to an active state, and thereby makes the scanning reader 31 active, and reads a scanning signal SC from the buffer memory 32.

When the control signal C3 supplied from the queue length detector 30 changes from the inactive state to the active state, the scanning reader 31 connected to the queue length detector 30 switches a control signal C1 output to the buffer memory 32 from an inactive state to an active state, and reads voice packets that constitute a queue at that time one after another, and supplies a scanning signal SC that consists of the read voice packets to the packet deleting device 20.

The voice packets PI that constitute the scanning signal SC must be read in a sufficiently shorter time than the aforementioned decoding unit time. For example, the period of time can be to read about 100 voice packets PI during 1 decoding unit time.

The original purpose of reading one voice packet PI during ten milliseconds (i.e., during 1 decoding unit time) is to match the operation speed (decoding speed) of the voice decoder 17 for generating the voice output to which a user listens. The buffer memory 32 has performance characteristics of much greater reading speeds than this (for example, reading can be performed by the order of 100 nanoseconds even if a slow-speed CMOS, for example, is used as the buffer memory 32). Therefore, such a scanning signal SC can be fully realized.

When the voice packet PI that constitutes the queue is read from the buffer memory 32 as a voice packet PO, the queue is processed, and the queue length is shortened proportionately with the read voice packet PI. However, the queue is not processed even if the scanning reader 31 reads it as a scanning signal SC, and, accordingly, the queue length does not differ before and after this reading.

Since the higher threshold TH is situated between the 100th packet and the 99th packet in this embodiment, the number of voice packets to be read by the scanning reader 31 exceeds one hundred packets. However, a limit can be imposed on this number if necessary.

As an example, only 30 packets from the top (in the example of FIG. 2, from the voice packet P102 to the voice packet P73) can be read so as to serve as the scanning signal SC.

In FIG. 2, the position where the voice packet PI is written onto the buffer memory 32 is different from the position where the voice packet PI is read, and it looks as if the figure shows a dual port memory. However, this figure does not specify such a hardware structure.

Any type of hardware structure is allowable if the buffer memory 32 can function as a FIFO memory. For example, adjacent regions in FIG. 2 (e.g., a region where the voice packet P1 is stored and a region where the voice packet P2 is stored) are not necessarily needed to be physically adjacent to an actual buffer memory (32). The reason is that, generally, the queue is logically realized by the use of a list structure.

Additionally, processing is not needed to be applied to the buffer memory 32 after the scanning signal SC is read because the contents of data remain in the buffer memory 32 even if the voice packet PI is merely read. When a description from this viewpoint is given of the processing for reading the voice packet PI that constitutes the queue as the voice packet PO, the following can be said. The data about the voice packet PI that has been read remains in the buffer memory 32 as a result of merely reading the voice packet PI, as described above, but, after it is read as the voice packet PO, a region on the buffer memory 32 where the read voice packet PI has been stored reaches a state of being able to be occupied by voice packets PI that are to be written later (i.e., writable state).

In order to reduce the possibility of occurrence of the aforementioned exhaustion in the thus constructed buffer device 16, the longer the queue is, the better. However, if the queue is too long, the transmission delay becomes substantially long, and this will increase the possibility that, for example, the response, which is brought by the voice packet PI from the voice communications device 11, to the contents of voices in a bidirectional conversation might be unnaturally delayed. For this reason, the buffer device 16 controls the buffer memory 32 so as to always maintain a fixed amount of packets (i.e., a queue with a fixed length) in cooperation with both the complementary-packet inserting device 19 and the packet deleting device 20.

On the other hand, the packet deleting device 20 of FIG. 1, which receives a control signal C4 from the queue length detector 30 and receives a scanning signal SC from the scanning reader 31, supplies the scanning signal SC to the voice presence/absence judging device 21, thereafter receives a judgment result DC, thereafter determines a voice packet to be deleted on the queue on the basis of the judgment result DC, and outputs a control signal C5 according to the determination.

In greater detail, the packet deleting device 20 inquires of the voice presence/absence judging device 21 about each packet of the buffer memory 32 when the voice packets PI kept in the buffer memory 32 exceed the higher threshold TH (i.e., when the control signal C4 reaches an active state), and the packet deleting device 20 deletes a voice packet judged as voice-absence.

At this time, the packet deleting device 20 not only evaluates and deletes a voice packet immediately before being given to the voice decoder 17 (i.e., a voice packet (PI) occupying the top position), but also scans a plurality of voice packets stored in the buffer memory 32 by the use of the scanning signal SC, and determines a to-be-deleted packet on the basis of a voice presence/absence judgment result DC for a packet before and after each packet and on the basis of the ratio of voice-absence packets.

Generally, a device that decodes a voice by a packet unit is needed to decode packets at a fixed time interval that corresponds to the decoding unit time. However, the application of this embodiment makes it possible to precedently process the voice presence/absence judgment of the packets and the deletion of the packets. In other words, they can be processed when the load of a processor is low, and the operating ratio of the processor can be improved.

Additionally, when voice packets PI to be deleted are determined, the packet deleting device 20 functions so that the to-be-deleted voice packets PI can disperse without succession on a queue as completely as possible, and a necessary number (deletion number) of voice packets can be deleted while deleting the voice packets judged as voice-absence as fully as possible.

However, cases will occur in which all these conditions cannot be satisfied according to circumstances. For example, in one of the cases, a control signal C4 supplied from the buffer device 16 has reached an active state because the queue length has exceeded the higher threshold TH, while a judgment result DC shows that all of the voice packets P1 to P102 are voice-presence.

In this case, a solution is to advance the processing while regarding a packet that seems more like voice-absence as a voice-absence packet. Even in this case, it is necessary to control them so as not to consecutively arrange the voice-absence-like voice packets without succession on a queue.

As a result of this deletion, a packet less similar to a voice-presence packet, described later, (i.e., a packet like a voice-absence packet) might remain at a position on the queue, and a packet higher in likeness degree to voice presence than the remaining packet lower in likeness degree to voice presence might be deleted from a position on the queue. However, when seen as the entire queue, it is very likely that the quality of voice output obtained when decoded will improve even greater than in a case where the deletion of packets consecutive on a queue is allowed.

Herein, the term "deletion" means the act of bringing a region on the buffer memory 32 where a voice packet PI to be deleted has been stored into a writable state. Therefore, generally, the control signal C5 in deletion specifies one memory address or a plurality of memory addresses from among a great number of memory addresses on the buffer memory 32 (note that one voice packet PI is written in a region specified by one memory address), and brings a memory region (memory regions) specified by the memory address (memory addresses) into a writable state.

The voice presence/absence judging device 21 that receives a scanning signal SC from the packet deleting device 20 decodes a packet inquired by the packet deleting device 20 (i.e., a packet contained in the scanning signal SC) once, or extracts voice power information therefrom, and thereby judges whether the packet belongs to the state of voice presence or belongs to the state of voice absence.

Generally, a background noise intensity is estimated from a voice power record, thereafter an estimated S/N ratio (ratio of signal to noise) is calculated therefrom, and voice presence/absence is judged from this estimated S/N ratio.

The complementary-packet inserting device 19 that receives a control signal C2 from the buffer device 16 generates and outputs a predetermined complementary packet PP that contains voice data that emits a slight noise near voice absence as a decoded voice when the control signal C2 reaches an active state.

The complementary packet PP output by the complementary-packet-inserting device 19 in this embodiment is assumed to be fixedly inserted into the aforementioned top position.

The voice decoder 17 that receives voice packets PO from the buffer device 16 at intervals of the decoding unit time decodes the voice packets PO according to a predetermined procedure, and emits decoded voice output from the speaker 18.

A description will be hereinafter given of the operation of this embodiment that has the above-mentioned structure.

(A-2) Operation of the First Embodiment

The queue-length detector 30 monitors the length of a queue that consists of voice packets PI stored in the buffer memory 32 always in real time by the use of the detection signal D1.

When the queue length is shorter than the higher threshold TH and longer than the lower threshold TL, the control signals C2 to C4 output from the queue length detector 30 maintain an inactive state, and the control signal C1 output from the scanning reader 31 also maintains an inactive state. Accordingly, the complementary-packet-inserting device 19, the packet deleting device 20, and the voice presence/absence-judging device 21 shown in FIG. 1 are not actuated.

Therefore, likewise, when the voice packets P1 to P99 shown in FIG. 2 are stored in the buffer memory 32, the complementary-packet-inserting device 19, the packet deleting device 20, and the voice presence/absence-judging device 21 are not actuated.

In the state where the voice packets P1 to P99 are stored, a queue whose queue length is 99 packets will exist in the buffer memory 32 by means of the voice packets P2 to P100 if one decoding unit time passes, and the initially stored voice packet P1 is read as a voice packet PO, and thereafter the voice packet P100 is received from the Internet 15 and is stored in the buffer memory 32. However, in this state, likewise, the complementary-packet-inserting device 19, the packet deleting device 20, and the voice presence/absence-judging device 21 are not actuated.

However, if one decoding unit time passes, and the voice packets P100 to P102 are received from the Internet 15 and are stored in the buffer memory 32 as shown in, for example, FIG. 2 before the initially stored voice packet P1 is read in the state where the voice packets P1 to P99 are stored, its queue length becomes 102 packets, which exceeds the higher threshold TH. Thus, because of jitter generated on the Internet 15, a situation will occur in which a plurality of voice packets (P100 to P102) are received during a period during which, originally, only one voice packet (herein, P100) should be received.

The queue length detector 30 that has detected the queue length in excess of the higher threshold TH on the basis of the detection signal D1 switches the control signals C3 and C4 from an inactive state to an active state.

The packet deleting device 20 that has detected a shift in the control signal C4 to the active state waits for the supply of a scanning signal SC.

The scanning reader 31 that has detected a shift in the control signal C3 to the active state switches the control signal C1 from the inactive state to the active state, and reads all of the voice packets P1 to P102 that constitute the queue at the present time as the scanning signal SC, and supplies the scanning signal SC to the packet deleting device 20.

The packet deleting device 20 supplied with the scanning signal SC supplies the scanning signal SC to the voice presence/absence judging device 21, and receives a judgment result DC from the voice presence/absence judging device 21.

The packet deleting device 20 that has received the judgment result DC carries out deletion so as to satisfy the above-mentioned conditions as much as possible. That is, the packet deleting device 20 outputs the control signal C5 that has content which causes the to-be-deleted voice packets PI to disperse without succession on a queue as completely as possible, and that has content of deleting the voice packets judged as voice-absence as fully as possible.

The voice packets are deleted according to, for example, the following methods.

Figure 3:
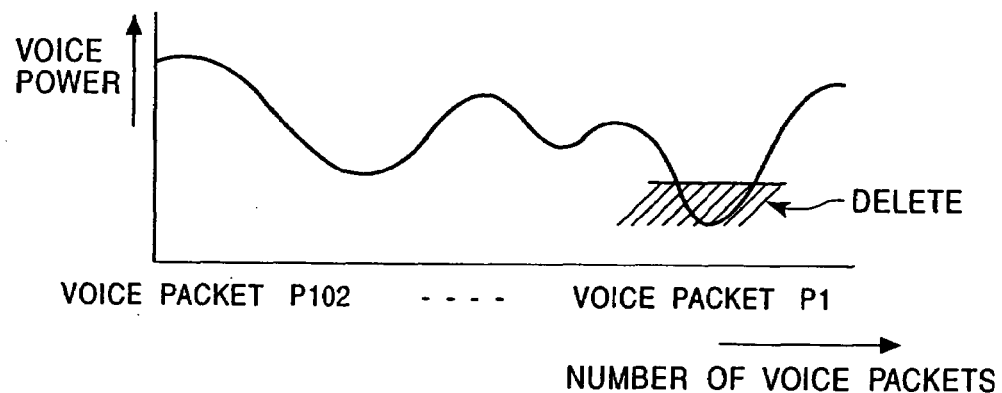
FIG. 3 through FIG. 6 show various methods of determining a voice packet to be deleted.

It is a first method to decode the voice packets so as to compare the respective voice powers, and to delete the voice packets in the ascending order of power. FIG. 3 shows a curve that indicates voice power obtained by decoding the voice packets P1 to P102, in which the voice packets within a range in the vicinity of the voice packet P1 lowest in power, which is shown by oblique lines, are deleted.

Figure 4:
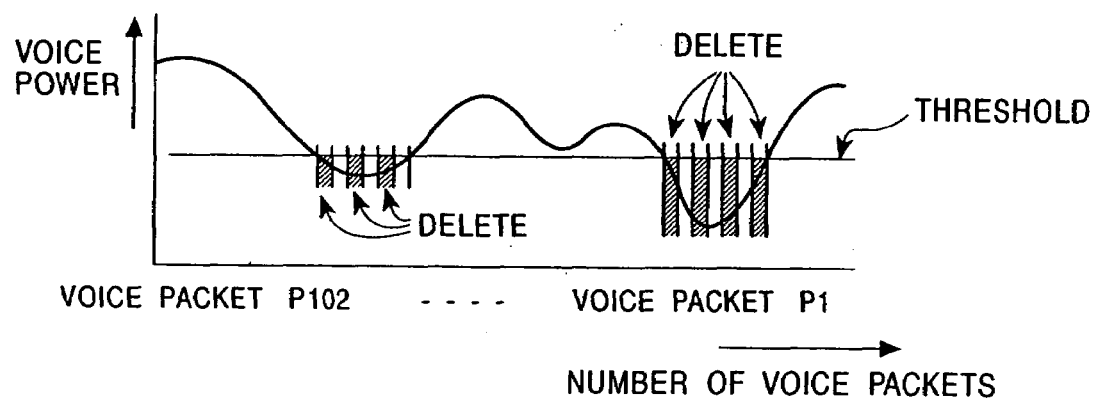

It is a second method to decode the voice packets so as to compare the respective voice powers, for example, with the power at voice absence as a threshold, thereafter retrieve each voice packet whose voice power is below the threshold, and delete voice packets from among the retrieved packets at predetermined intervals or at random. FIG. 4 shows a curve that indicates voice power obtained by decoding the voice packets P1 to P102, in which powerless voice packets with predetermined frequency between the voice packets P1 and P102, which is shown by oblique lines, are deleted.

Figure 5:
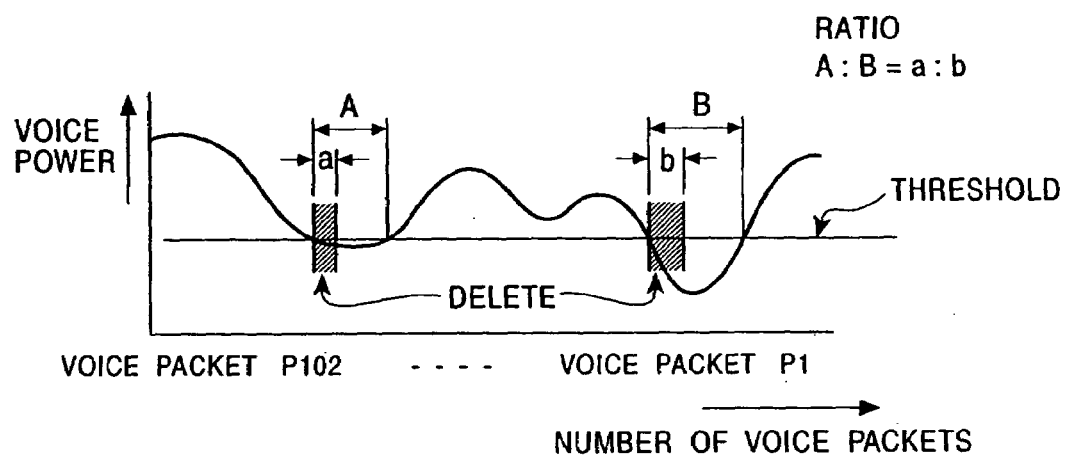

It is a third method to decode the voice packets so as to compare the respective voice powers, for example, with the power at voice absence as a threshold, thereafter retrieve each voice packet whose voice power is below the threshold, and delete voice packets from among the retrieved packets in accordance with the length of a part below the threshold. FIG. 5 shows a curve that indicates voice power obtained by decoding the voice packets P1 to P102, in which voice packets are deleted that are included in duration "a" and duration "b" shown by the oblique lines that are proportionate to length "A" and length "B", respectively, of a part consisting of packets lower in power than the threshold between the voice packets P1 and P102.

Figure 6:
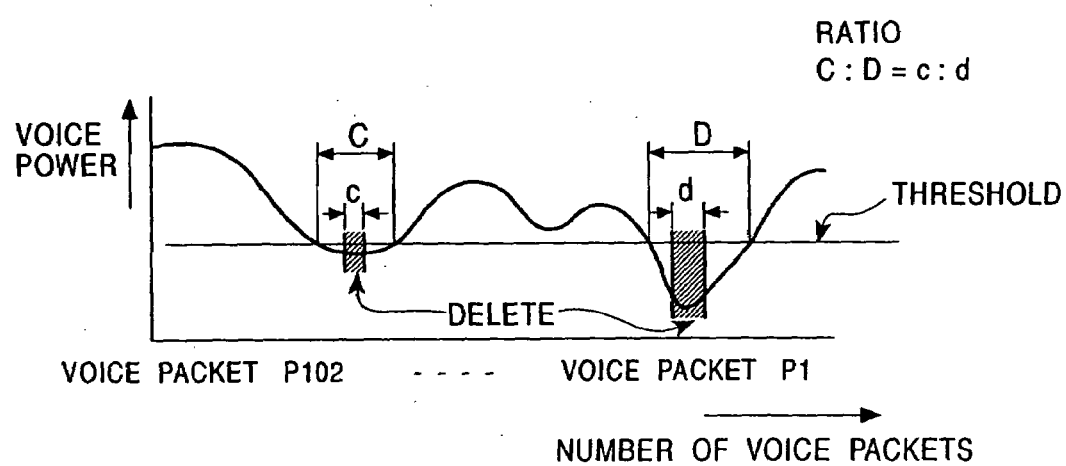

It is a fourth method to decode the voice packets so as to compare the respective voice powers, for example, with the power at voice absence as a threshold, thereafter retrieve each voice packet whose voice power is below the threshold, and delete voice packets in accordance with the length of a part below the threshold that are included in a most powerless part below the threshold from among the retrieved packets. FIG. 6 shows a curve that indicates voice power obtained by decoding the voice packets P1 to P102, in which voice packets are deleted that are included in duration "c" and duration "d" shown by the oblique lines that are proportionate to length "C" and length "D", respectively, of a part consisting of packets lower in power than the threshold between the voice packets P1 and P102 and that are the most powerless voice packets.

For example, if the judgment result DC is that the voice packets P1 to P5 and P98 to P102 are voice absence among the voice packets P1 to P102 and if the number (deletion number) of voice packets to be deleted is three, the voice packets P4, P99, and P101, for example, are deleted, and a queue whose queue length is 102 packets made up of the voice packets P1 to P102 is converted into a queue whose queue length is 99 packets made up of the voice packets P1, P2, P3, P5 to P98, P100, and P102.

How to determine the deletion number is a problem. In consideration of the fact that deletion is a cause of deterioration in the decoded voice output, it might be preferable to fix the deletion number at a bare minimum (i.e., the minimum deletion number where the queue length does not exceed the higher threshold TH).

However, there is a case where the queue length that has once fallen below the higher threshold TH by the deletion frequently exceeds the higher threshold TH again because of a reduction in the deletion number, and an excessive load is imposed on the processing of the packet deleting device 20 or the voice presence/absence judging device 21 in relation to the reading of the scanning signal SC. There is a solution in this case to increase the deletion number and reduce the load.

In this embodiment, it is possible to analyze not only the voice packet occupying the top position (i.e., the voice packet that corresponds to the voice packet P1 of FIG. 2) but also a voice packet group made up of a great number of voice packets that constitute a queue, and determine voice packets to be deleted on the basis of the analytic result. Therefore, the positions of the voice packets to be deleted can be dispersed on the queue.

On the other hand, the queue length of one packet will change as a result of the present reading, and a packet to be read will not exist in the next reading after the lapse of the decoding unit time if only the voice packet P1 of FIG. 2 constitutes the queue. This means that the exhaustion of the voice packet has occurred.

The queue length detector 30 that has detected this exhaustion by the use of the detection signal D1 switches the control signal C2 from the inactive state to the active state and allows the complementary-packet inserting device 19 to produce and output the complementary packet PP.

The position where the complementary-packet-inserting device 19 inserts the complementary packet PP is the top position occupied by the voice packet PI.

In the above description of the operation, all voice packets of about 100 packets that constitute the queue are read as the scanning signal SC and are processed in a single run when the queue length exceeds the higher threshold TH. However, about 100 voice packets may be divided and processed if there is a need to secure processing time in the packet deleting device 20 and the voice presence/absence judging device 21.

For example, the processing of the packet deleting device 20 may be executed such that a spare threshold ST is set at a lower position than the higher threshold TH (e.g., position where the queue length is about 60 packets), and, when the queue length exceeds the spare threshold ST, all of the voice packets or a part thereof that constitute the queue at that time are read as the scanning signal SC so as to obtain its judgment result DC, and, when the queue length exceeds the higher threshold TH, a judgment result DC for only the voice packet that has not yet obtained a judgment result DC is obtained.

Alternatively, without setting such a spare threshold ST, a voice presence/absence judgment may be made when processing capability has room, and its judgment result DC may be stored regardless of the queue length.

However, since the deletion of the voice packet is not carried out if the queue length does not exceed the higher threshold TH, the obtained judgment result DC loses the significance of the existence and becomes useless when a corresponding voice packet is read as the packet PO. Therefore, from the viewpoint of processing efficiency, it is an excellent solution to make a voice presence/absence judgment when the queue length actually exceeds the higher threshold TH or when the possibility of exceeding it rises fully, and, additionally, processing capability has room.

(A-3) Effect of the First Embodiment

According to this embodiment, since the positions of voice packets to be deleted can be dispersed into a queue, a more natural, higher-quality decoded voice can be obtained than in a case where voice-absence packets at specific positions (e.g., the aforementioned top position) are continuously deleted.

Further, if a voice-absence packet is selected while paying attention only to the voice packet occupying the top position, a dangerous possibility where the first sound of a conversation will be regarded as voice absence by mistake because of a vague relationship with the subsequent voice packet exists. However, according to this embodiment, since a voice packet at a time-position subsequent to the top position is analyzed and thereafter a voice packet to be deleted is selected, the first sound can be easily found, and the first sound can be prevented from being deleted by mistake by carrying out a process of, for example, not deleting a voice packet located immediately before a voice packet judged as voice presence on a queue even if the voice packet located immediately before it is judged as voice absence.

Further, in the case where deletion is carried out at the top position, a voice packet at the top position must be decoded at once if it is not deleted, and therefore a voice presence/absence judgment, a judgment whether to be deleted or not, a decoding process, etc., must be intensively carried out in a short time. This time concentration causes the inevitable occurrence of a load. However, according to this embodiment, since it is easy to execute the processing in the voice communications device while delaying or hastening it and, additionally, dispersing it, the processing of the packet deleting device 20 and the voice presence/absence judging device 21 can be carried out during a low-load period during which, for example, the processing of the voice decoder 17 that has high priority is not carried out, and the load resulting from time can be efficiently dispersed.

(B) Second Embodiment

Only the difference between the first embodiment and the second embodiment will be described hereinafter.

(B-1) Structure and Operation of the Second Embodiment

FIG. 3 shows an internal structure of a fluctuation absorbing buffer device 46 provided instead of the fluctuation absorbing buffer device 16 of FIG. 2 in this embodiment.

The buffer device 46 is an element that corresponds to the buffer device 16 of the first embodiment, and the basic function thereof is the same as that of the buffer device 16.

Figure 8:
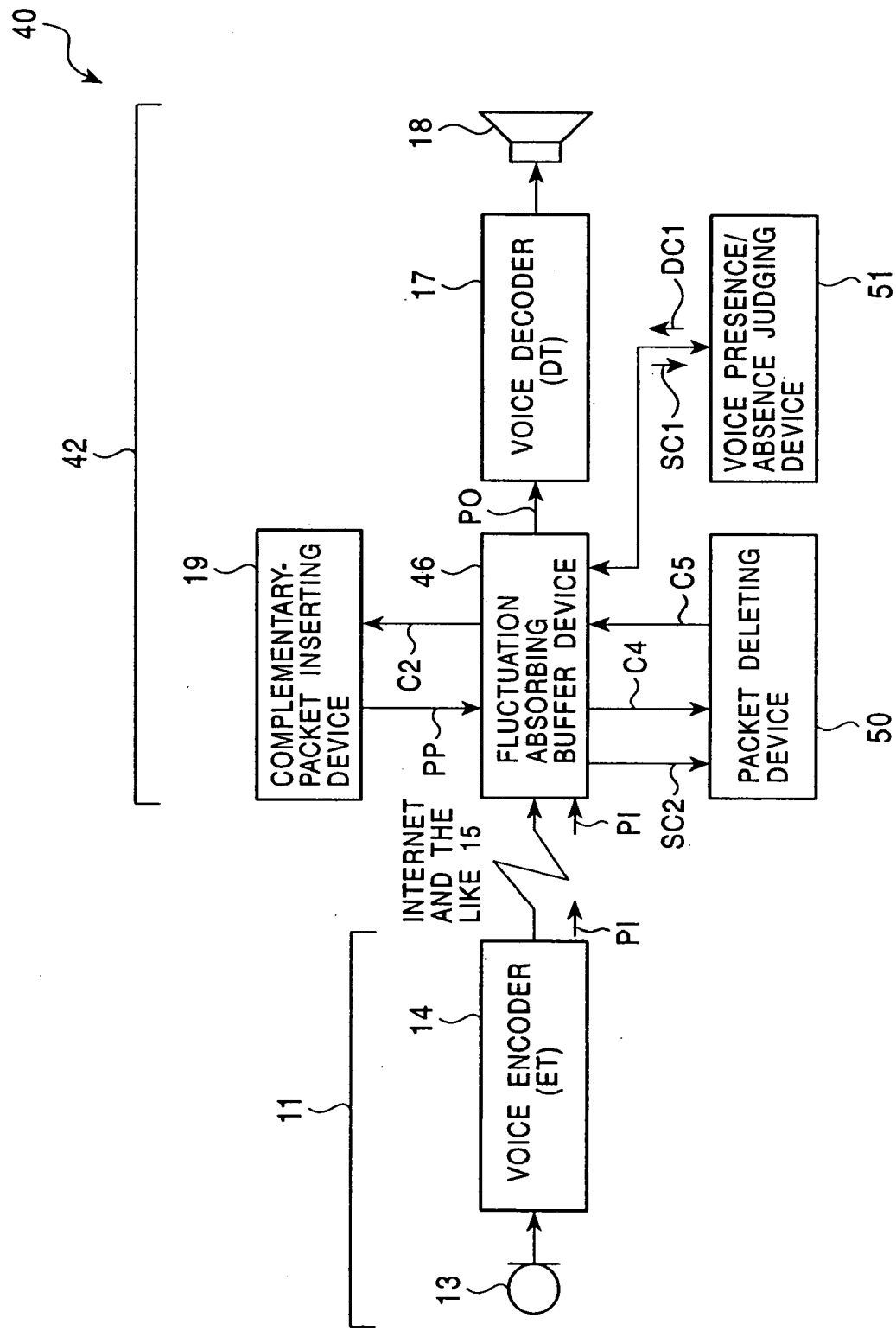
FIG. 8 is a schematic diagram that shows a structure of a principal part of a voice communications system according to a second embodiment.

The whole structure of a voice communications system 40 that includes a voice communications device 42 on the receiving side where the buffer device 46 is mounted is as shown in FIG. 8.

In other words, the structure of the voice communications system 40 of this embodiment is basically the same as that of the voice communications system 10 of the first embodiment shown in FIG. 1.

In FIG. 8, the voice communications system 40 of this embodiment has the voice communications device 11, the Internet 15, and the voice communications device 42.

In FIG. 8, the functions of each component and each signal, to which the same reference character as that of FIG. 1 is given, are the same as those of FIG. 1.

That is, in this embodiment, each component other than the components 40, 42, 46, 50, and 51, and the function of each signal other than the signals DC1, SC1, and SC2 are the same as those of the first embodiment.

Figure 7:
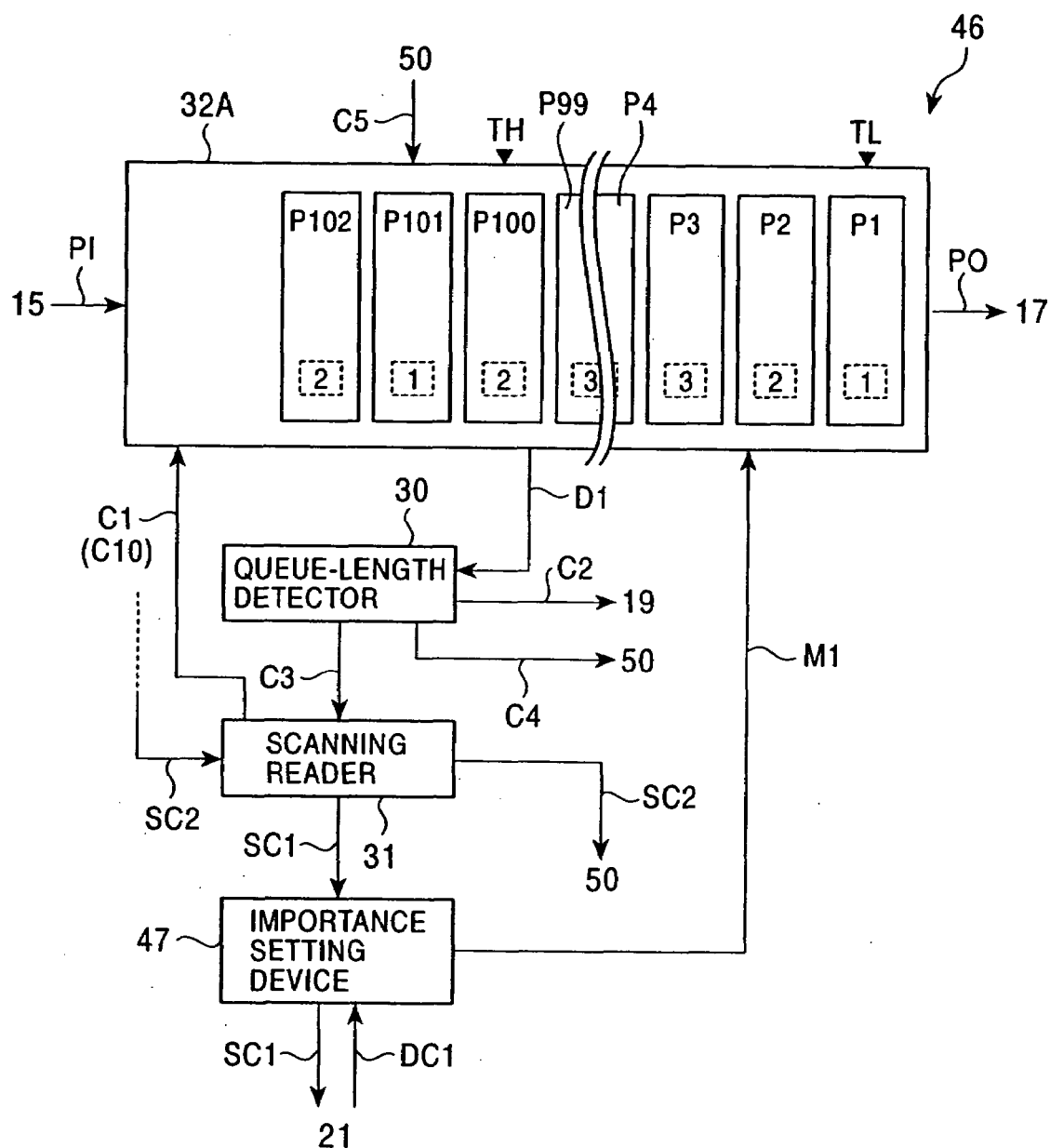
FIG. 7 is a schematic diagram that shows a structure of the buffer device of the first embodiment.

A voice presence/absence judging device 51 of this embodiment returns importance as a judgment result DC1 indicating the three-grade "likeness degree to voice presence", not a judgment result DC of binary voice presence/absence, when the device 51 receives a scanning signal SC1 from an importance setting device 47 shown in FIG. 7. Herein, the "likeness degree to voice presence" corresponds to a value obtained as a result of the processing of the voice presence/absence judging device 51, and indicates the height of the probability that voice data contained in a certain voice packet will be voice presence.

However, since the voice presence/absence judging device 51 calculates the "likeness degree to voice presence" according to an installed program, there is no guarantee that its calculation result will completely coincide with a conclusion obtained when the decoded voice output is actually perceived by the auditory organs of a person.

In contrast, "likeness degree to voice absence" is a concept conflicting with the "likeness degree to voice presence", and indicates the height of the probability that voice data contained in a certain voice packet will be voice absence.

When the necessity of deletion occurs because, for example, the queue length has exceeded the higher threshold TH, the packet deleting device 50 of this embodiment receives the importance from the buffer device 46 as the scanning signal SC2, thereafter determines a voice packet to be deleted on the basis of this importance, and carries out the deletion.

Therefore, an exchanged signal, such as the signals SC and DC of the first embodiment, does not exist between the packet deleting device 50 and the voice presence/absence judging device 51 of this embodiment.

In FIG. 7, the buffer device 46 of this embodiment includes the queue length detector 30, the scanning reader 31, a buffer memory 32A, and the importance setting device 47.

In FIG. 7, the functions of each component 30, 31, TH, TL, and each signal PI, PO, C1 to C5 and D1, to which the same reference character as that of FIG. 2 is given, are the same as those of FIG. 2.

Therefore, the difference between this embodiment and the first embodiment is limited to a part that chiefly relates to the buffer memory 32A and the importance setting device 47.

The buffer memory 32A of the two is a FIFO memory basically having the same function as that of the buffer memory 32, and, in addition, the memory 32A functions to store importance M1 supplied from the importance setting device 47 in association with each voice packet (e.g., P1) that constitutes a queue. Each voice packet may be assigned to each importance in the form of hardware or in the form of software.

In this embodiment, there is a need to set the importance M1 prior to the deletion of the voice packet that constitutes the queue in the buffer memory 32A.

A frame in the interior of each voice packet P1 to P102 shown by the dotted line in FIG. 7 is a part where the importance is stored, and numerals 1 to 3 in the frames indicate the importance.

The importance is classified into three grades in this embodiment. The larger the grade numeral is, the higher the "likeness degree to voice presence" of voice data contained in a corresponding voice packet is. The importance is set (written) in the buffer memory 32A in accordance with an importance setting signal M1 output by the importance setting device 47.

The importance setting device 47 receives the supply of a scanning signal SC1 from the scanning reader 31, and thereby detects the coming of importance-setting timing with which importance is set. Like the scanning signal SC of the first embodiment, the scanning signal SCI is a signal constructed by each voice packet that constitutes a queue at that time.

The scanning signal SCI is supplied from the importance setting device 47 to the voice presence/absence judging device 51, and the voice presence/absence judging device 51 returns a three-grade judgment result DC1 for each voice packet to the importance setting device 47.

The importance setting device 47 that has received the judgment result DC1 outputs the importance setting signal M1 that corresponds to the judgment result DC1, and sets the importance M1.

Thereafter, when the voice packet is deleted, the scanning reader 31 reads the importance M1 assigned to each voice packet (in FIG. 7, P1 to P102) as a scanning signal SC2, and supplies it to the packet deleting device 50.

The packet deleting device 50 executes the deletion based on the importance M1. Generally, even a voice packet whose packet importance is relatively high is deleted when the number of stored packets is large, and the queue length is longer than the higher threshold TH, whereas no voice packet is deleted when the queue length is shorter than the higher thresholds TH.

The packet deleting device 50 outputs the control signal C5 so that the position of a voice packet to be deleted is dispersed on a queue as non-consecutively as possible and so that a voice packet as low in importance as possible is deleted.

The deleting timing in this embodiment can be the same as that in the first embodiment, and the importance-setting timing is carried out in the same way as the deleting timing (i.e., importance is set when the queue length exceeds the higher threshold TH, for example, and deletion is carried out immediately after the importance is set), or, alternatively, the importance-setting timing is carried out earlier than the deleting timing.

In FIG. 7, a control signal C10 output from the scanning reader 31 serves to read the scanning signal SCI, and the control signal C1 serves to read the scanning signal SC2.

(B-2) Effect of the Second Embodiment

According to this embodiment, the same effect as that of the first embodiment can be obtained.

In addition, since a voice packet to be deleted is determined by the use of the three-grade importance in this embodiment, the occurrence frequency and level of deterioration in sound quality caused by the deletion can be reduced, and the quality of the decoded voice output obtained after the deletion is higher than that of the first embodiment in which only the two-phase judgment criterion (i.e., voice presence and voice absence) is used.

Further, a packet with relatively high importance (e.g., packet with importance 2) is also deleted when the number of stored packets is considerably larger than the higher threshold, for example, and only a packet with low importance is deleted when the number thereof is slightly larger. Therefore, since the importance of a packet to be deleted can be changed in accordance with the largeness of the number of stored packets with respect to the higher threshold, flexible control can be achieved.

(C) Third Embodiment

Only the difference between this embodiment and the first embodiment will be described hereinafter.

This difference is limited to the fact that the higher threshold (TH) fixed in the first embodiment can be dynamically changed.

(C-1) Structure and Operation of the Third Embodiment

Figure 9:
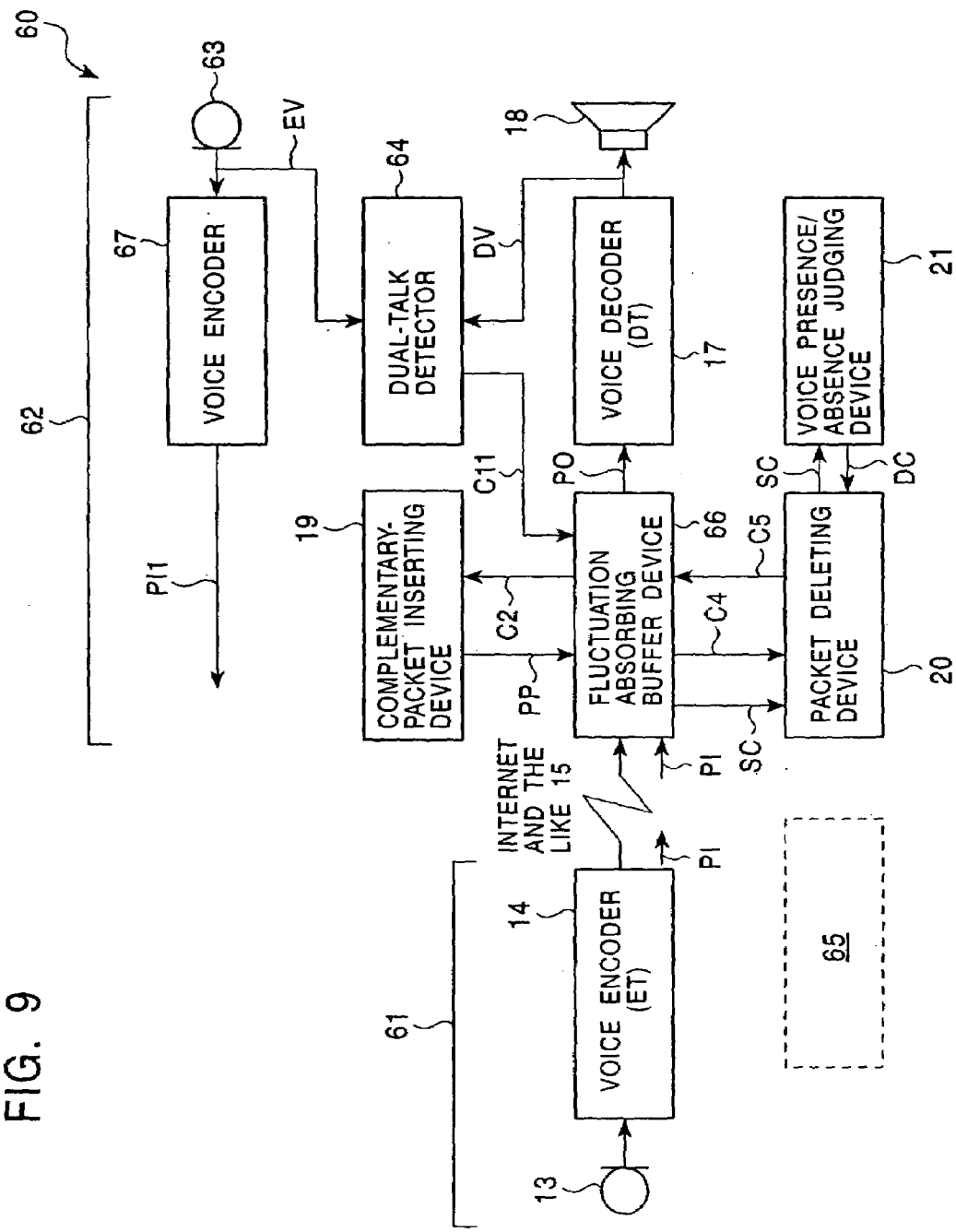
FIG. 9 is a schematic diagram that shows a structure of a principal part of a voice communications system according to a third embodiment.

A structure of a principal part of a voice communications system 60 of this embodiment is shown in FIG. 9.

In FIG. 9, the functions of each component and each signal, to which the same reference character as that of FIG. 1 is given, are the same as those of FIG. 1.

Therefore, in FIG. 9, the structure of the voice communications device 62 of this embodiment is different from that of the voice communications device 12 in that the device 62 has a microphone 63, a voice encoder 67, and a dual-talk detector 64, in the internal structure of a fluctuation absorbing buffer device 66.

Further, the voice communications device 61 of this embodiment is different from the voice communications device 11 in that the device 61 has a receiving circuit 65.

The receiving circuit 65 may include the same components as the complementary-packet inserting device 19, the fluctuation absorbing buffer device 66, the voice decoder 17, the packet deleting device 20, and the voice presence/absence judging device 21 that are included in the voice communications device 62.

Among the components of the voice communications device 62, the microphone 63 corresponds to the microphone 13, and the voice encoder 67 corresponds to the voice encoder 14.

That is, in this embodiment, the higher threshold TH1 is changed by detecting whether the duration of a dual-talk state in which two paths for transmission and for reception simultaneously reach the state of voice presence in the voice communications device 62 is extended or shortened. Therefore, both the voice communications devices 61 and 62 are required to be a transmitting/receiving device, not a communications device only for transmission or only for reception.

As described above, in order to reduce the possibility of the occurrence of exhaustion, the longer the queue is, the better. However, if the queue is too long, the transmission delay becomes substantially long, and this will increase the possibility that, for example, the response to the contents of voices in a bidirectional conversation might be unnaturally delayed. For this reason, the buffer device 66 controls the buffer memory 32 so as to always maintain a fixed amount of packets (i.e., a queue with a fixed length) in cooperation with the complementary-packet inserting device 19 or the packet deleting device 20.

Therefore, in the buffer device 16 of the first embodiment, the deletion of a voice packet is executed by the use of the control signal C5 supplied from the packet deleting device 20 so as to reduce a queue length when the queue length exceeds the higher threshold TH.

However, to put it another way the deletion is executed when the queue length exceeds the higher threshold TH, a delay at near the higher threshold TH is allowable.

However, it is technically known that the value of the optimum higher threshold TH (i.e., allowable delay) depends on the pattern of conversation in a situation where bidirectional conversation voices are exchanged via the telephone or the like.

This embodiment is carried out while paying attention to this respect, and is characterized in that the value of the higher threshold TH1 that corresponds to the aforementioned higher threshold TH is dynamically changed according to the pattern of conversation.

In the voice communications system 60 of this embodiment that has the structure of FIG. 9, a voice given by a user (speaker) on the side of the voice communications device 61 is output from the speaker 18 in the form of a voice output corresponding to a voice signal DV on the side of the voice communications device 62.

In contrast, a voice given by a user (speaker) on the side of the voice communications device 62 is input to the voice encoder 67 in the form of a voice signal EV, thereafter is contained in the voice packet PI1, and is heard by the user on the side of the voice communications device 61 through the network 15.

The dual-talk detector 64 in the voice communications device 62 simultaneously monitors the voice signal EV that is the input of the voice encoder and the voice signal DV that is the output of the voice decoder 17, thereafter totals the periods (dual-talk time) in which two paths (i.e., two voice signals EV and DV) are simultaneously in a state of voice presence, thereafter detects whether the dual-talk time has a tendency to become long or become short, and outputs a control signal C11 that corresponds to the detection result.

Specifically, the dual-talk time for the past ten seconds, for example, is measured at intervals of one second, and, if the dual-talk time is longer than that at the pre-measuring time (i.e., one second ago), the control signal C11 by which the higher threshold TH1 becomes small by one packet is output.

In contrast, if the dual-talk time is shorter than that at the pre-measuring time, the control signal C11 by which the higher threshold TH1 to be output becomes large by one packet is output.

Figure 10:
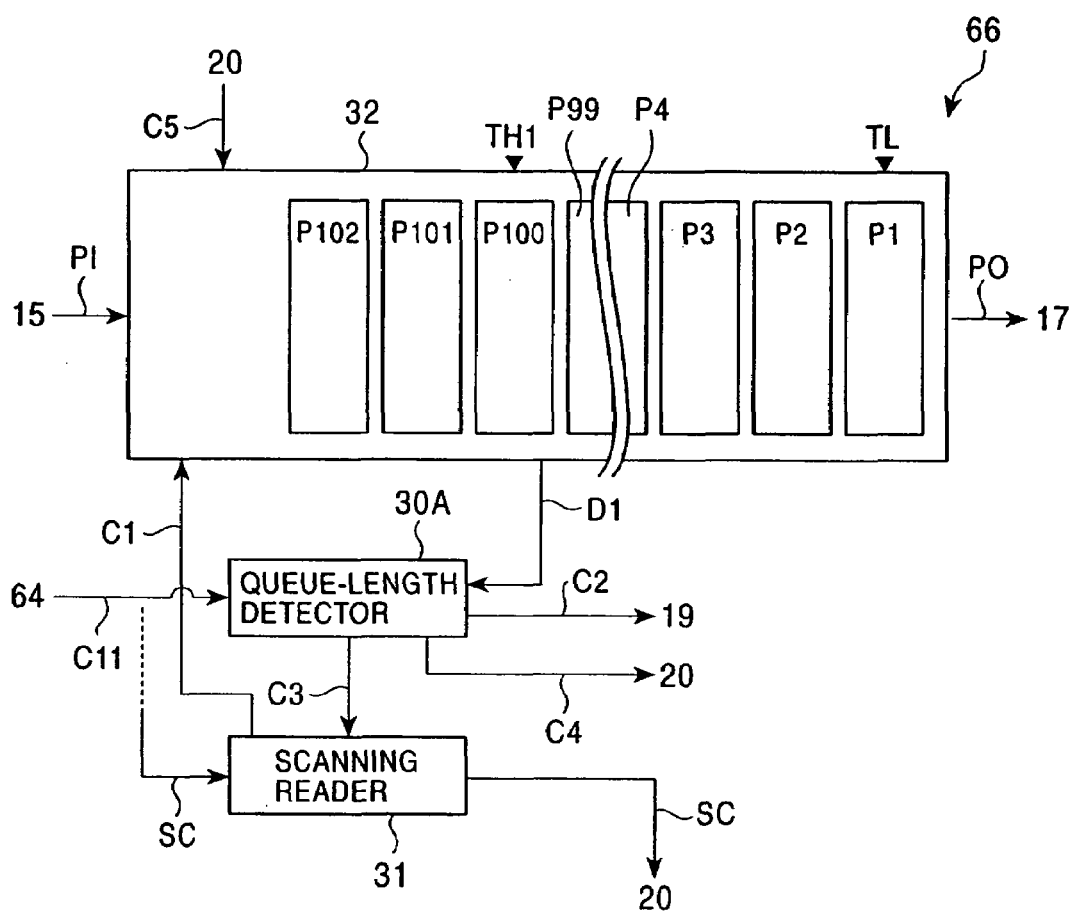
FIG. 10 is a schematic diagram that shows a structure of a buffer device according to the third embodiment.

The queue length detector 30A in the buffer device 66 shown in FIG. 10 receives this control signal C11. The queue length detector 30A first changes the higher threshold TH1 in accordance with the control signal C11, the detector 30A then examines whether the queue length is longer or shorter than the changed higher threshold TH1, and, if longer, the detector 30A switches the control signal C3 from the inactive state to the active state.

For example, in FIG. 10, the higher threshold TH1 is set at the position that corresponds to the queue length in the middle of 100 packets and 99 packets. If this is changed to become larger by one packet, the higher threshold TH1 is moved to the position that corresponds to the queue length in the middle of 101 packets and 100 packets. Subsequently, the relationship between the queue length and the higher threshold TH1 is examined on the basis of a changed higher threshold TH, and the packet deletion is executed for the first time when the 101st voice packet P101 is stored.

(C-2) Effect of the Third Embodiment

According to this embodiment, the same effect as in the first embodiment can be obtained.

In addition, in this embodiment, since the fixed delay (i.e., higher threshold TH1) can be dynamically changed in accordance with conversation patterns, a delay can be reduced when a dual-talk state that easily gives an unpleasant feeling to users frequently occurs, and thereby the quality of communication can be improved.

Contrarily, in a state (non-dual-talk state) where, for example, voice guidance is flowing, the fixed delay is enlarged, and this enlargement can make it difficult to generate a voice interruption caused by a buffer shortage.

(D) Fourth Embodiment

Only the difference between this embodiment and the first and third embodiments will be described hereinafter.

(D-1) Structure and Operation of the Fourth Embodiment

Figure 11:
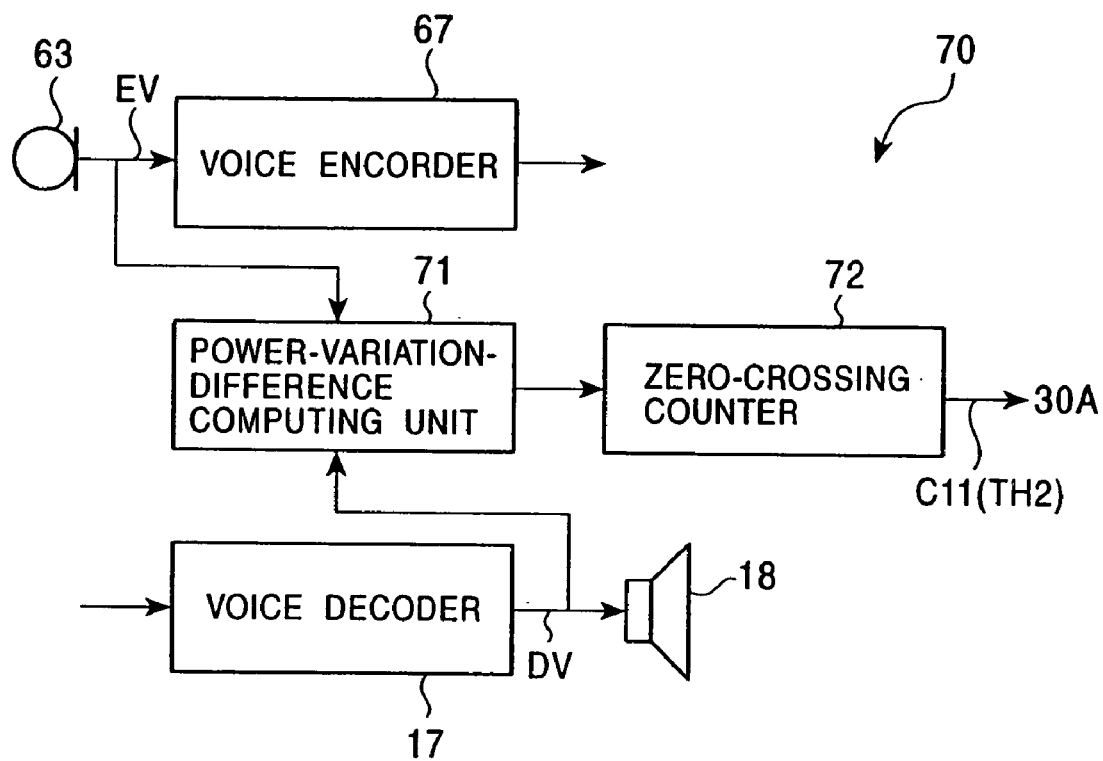
FIG. 11 is a schematic diagram that shows a structure of a principal part of a voice communications device according to a fourth embodiment.

A structure of a principal part of the voice communications system 70 of this embodiment is shown in FIG. 11.

In FIG. 11, the functions of each component and each signal, to which the same reference characters as that of FIG. 9 are given, are the same as those of FIG. 9.

That is, the voice communications system 70 of this embodiment has a structure in which the dual-talk detector 64 in the voice communications device 62 of the voice communications system 60 of the third embodiment is substituted with a power-variation-difference computing unit 71 and a zero-crossing counter 72.

With this structure, in the third embodiment, the control signal C11 is changed in accordance with the analytic result of a conversation pattern that corresponds to the tendency of extension/contraction of the dual-talk duration. On the other hand, in this embodiment, the control signal C11 is changed in accordance with the analytic result of a conversation pattern that corresponds to the time interval of an alternation in a conversation.

The computing unit 71 of this embodiment calculates voice power during a fixed time that has passed for the voice signal EV on the side of the encoder and the voice signal DV on the side of the decoder, and the computing unit 71 outputs its power difference.

Specifically, on each side, average power for 100 milliseconds that have passed is measured, for example, and its difference is output. A positive value is output if the power on the side of the encoder is larger, and a negative value is output if not.

Whenever the output of the computing unit 71 intersects zero, the zero-crossing counter 72 accumulates the intersected times. However, a threshold CL is provided in the vicinity of zero in input, and the unit 71 stably works while disregarding a small input change in amplitude below a given value such as a slight noise.

The zero-crossing counter 72 can output a control signal C11 that corresponds to the value (i.e., accumulated times) of the counter at intervals of, for example, one second, and can dynamically change a higher threshold TH2, which corresponds to the higher threshold TH1, in accordance with the control signal C11. After the control signal C11 is output, the counter value of the zero-crossing counter 72 is initialized to zero.

Accordingly, the control signal C11 by which the higher threshold TH2 becomes small by one packet is output if the counter value of the zero-crossing counter 72 is larger than the accumulated counter value of the pre-measuring time (i.e., one second ago), whereas the control signal C11 by which the higher threshold TH2 becomes large by one packet is output if smaller.

(D-2) Effect of the Fourth Embodiment

According to this embodiment, the same effect as that of the first embodiment can be obtained.

In addition, in this embodiment, a fixed delay can be dynamically changed in accordance with the analytic result of a conversation pattern that corresponds to the alternation time interval of a conversation.

The fixed delay is reduced in a conversation pattern that gives an unpleasant feeling to users, and, contrarily, the fixed delay is extended in a state where, for example, voice guidance is flowing. This can restrain the occurrence of a voice interruption caused by a buffer shortage.

(E) Fifth Embodiment

Only the difference between this embodiment and the first embodiment will be described hereinafter.

(E-1) Structure and Operation of the Fifth Embodiment

Figure 12:
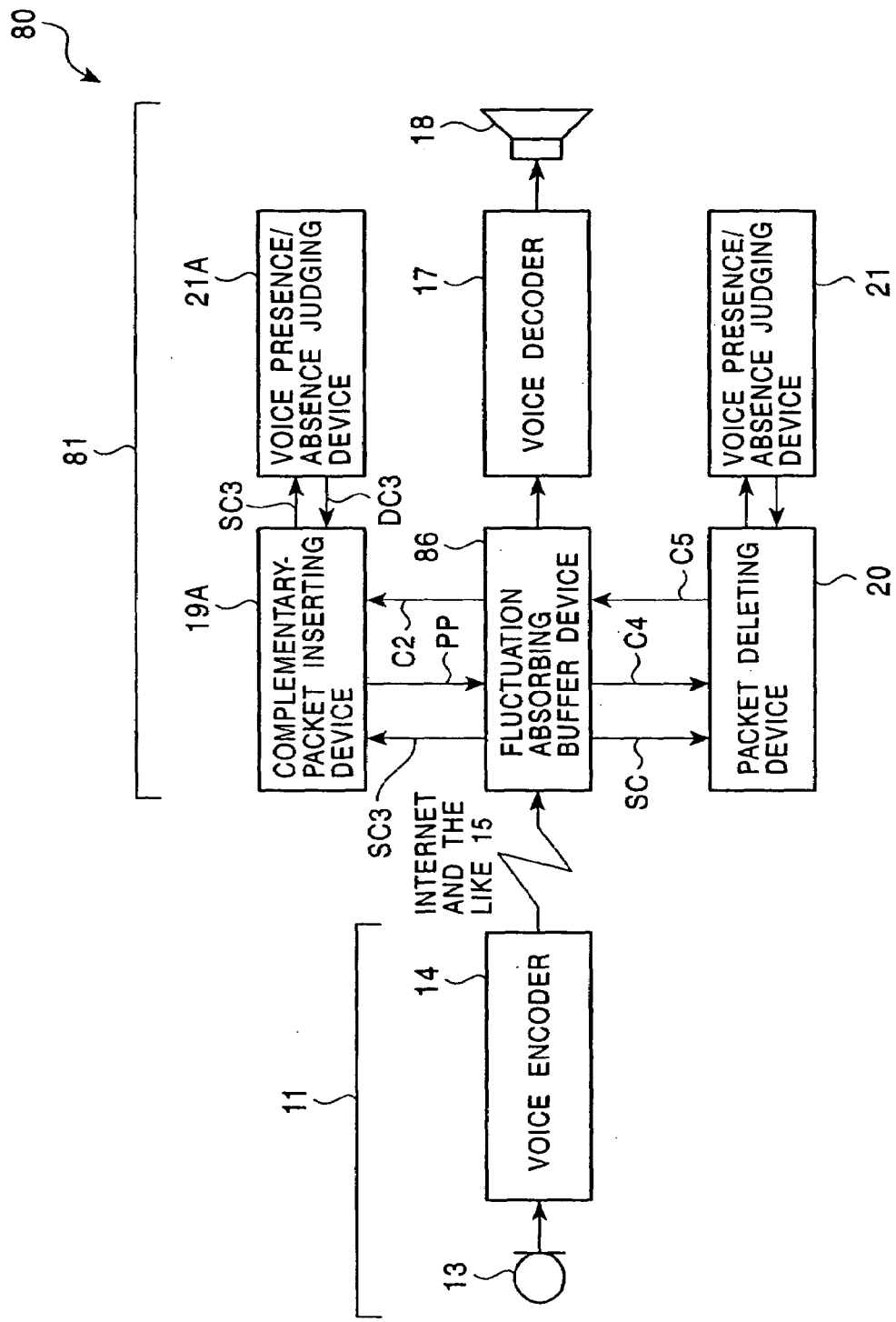
FIG. 12 is a schematic diagram that shows a structure of a principal part of a voice communications system according to a fifth embodiment.

The whole structure of a voice communications system 80 of this embodiment is shown in FIG. 12, and the internal structure of a buffer device 86 is shown in FIG. 10.

In FIG. 12, the functions of each component and each signal, to which the same reference character as that of FIG. 1 is given, are the same as those of FIG. 1. Therefore, in FIG. 12, the difference between this embodiment and the first embodiment is limited to a part that relates to the buffer device 86, the complementary-packet inserting device 19A, and the voice presence/absence judging device 21A.

As shown in FIG. 12, the voice presence/absence judging device 21A is connected to the complementary-packet inserting device 19A, and a scanning signal SC3 is supplied from the buffer device 86 to the complementary-packet inserting device 19B, and the scanning signal SC3 and a judgment result DC3 are exchanged between the voice presence/absence judging device 21A and the complementary-packet inserting device 19A.

Figure 13:
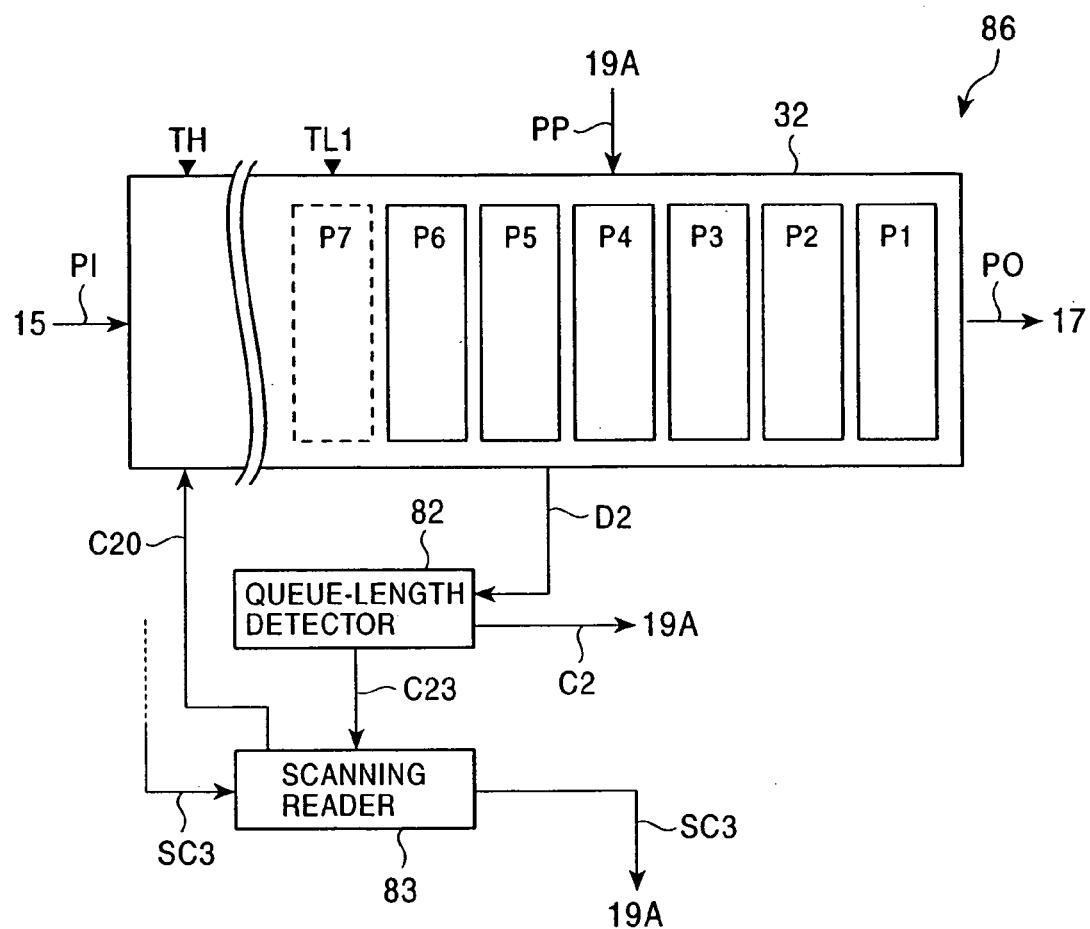
FIG. 13 is a schematic diagram that shows a structure of a buffer device according to the fifth embodiment.

Likewise, in FIG. 13, the functions of each component and each signal, to which the same reference character as that of FIG. 2 is given, are the same as those of FIG. 2. Therefore, in FIG. 13, the difference between this embodiment and the first embodiment is limited to a part that relates to a lower threshold TL1, a queue length detector 82, and a scanning reader 83.

Only the components and signals that relate to the lower threshold TL1, which characterize this embodiment, are shown in FIG. 13. Since the components and signals that relate to the higher threshold TH are the same as those of the first embodiment, they are not shown in the figure.

The difference between this embodiment and the first embodiment results from the fact that the lower threshold TL1 is set at the higher position than the top position in this embodiment.

As mentioned above, usually, the complementary packet PP is inserted to continue to supply a voice packet to the voice decoder 17 at intervals of the decoding unit time even when the exhaustion (shortage) occurs. Therefore, it is usual to set the lower threshold used to detect the timing of this insertion at the top position like the lower threshold TL of the first through fourth embodiments.

However, since the position where the complementary packet PP is inserted is fixed at the top position if the lower threshold is set at the top position, all that can be done is to mechanically insert the complementary packet PP when the queue length becomes zero. Therefore, consequentially, the complementary packet PP will be continuously inserted into the sequence of voice packets PO if the zero-state of the queue length continues over two or more periods of decoding unit time. This causes a marked deterioration in the quality of the decoded voice output.

In contrast, in this embodiment, the lower threshold TL1 corresponding to the lower threshold TL is set at the higher position than the top position, e.g., at the middle position of the queue length of 6 packets and the queue length of 7 packets as shown in FIG. 7.

In this case, the complementary packet PP is not inserted if the voice packet P7 shown by the dotted line in FIG. 13 is stored, but the reception of this voice packet P7 is delayed by the influence of, for example, jitter, and the queue will be made up of only the voice packets P1 to P6 if there is no storage, and, as a result, the queue length falls below the lower threshold TL1.

The queue length detector 82 monitors the relationship between the lower threshold TL1 and the queue length by the use of a detection signal D2 corresponding to the detection signal D1, and, when it detects that the queue length has become less than the lower threshold TL1, the queue length detector 82 switches the control signal C23 supplied to the scanning reader 83 from the inactive state to the active state, and switches the control signal C2 supplied to the complementary-packet inserting device 19A from the inactive state to the active state.

The scanning reader 83 that has detected that the control signal C23 has been switched from the inactive state to the active state reads voice packets (in the figures, the voice packets P1 to P6) that constitute the queue at the time of the scanning signal SC3, and supplies the scanning signal SC3 to the complementary-packet inserting device 19A.

The complementary-packet-inserting device 19A that has received the scanning signal SC3 supplies the scanning signal SC3 to the voice presence/absence judging device 21A. Like the voice presence/absence judging device 21, the voice presence/absence judging device 21A makes a voice presence/absence judgment about the voice packets P1 to P6 that constitute the scanning signal SC3, and returns its judgment result DC3 to the complementary-packet inserting device 10A.

Based on the judgment result DC3, the complementary-packet-inserting device 19A determines the position where the complementary packet PP is inserted. Herein, one complementary packet PP is inserted by one insertion.

When the insertion position is determined, the complementary-packet-inserting device 10A inserts the packet PP so as to disperse it as non-consecutively as possible, and controls the packet PP so as to insert it only immediately behind the interval of voice absence as much as possible.

In order to disperse and insert it, a sign (complementary-packet mark) is added to the inserted complementary packet, and, when a complementary packet is inserted the next time, the next complementary packet is inserted in such a way as not to be placed before and behind the previous complementary packet.

As a result, the voice of the decoded voice output at the interval of voice presence is prevented from being interrupted, which prevents a deterioration in the quality of the voice output that is caused when the complementary packet PP is inserted.

Generally, in a device for decoding a voice by the packet unit, a packet must be decoded at intervals of the aforementioned decoding unit time. However, according to this embodiment, a voice presence/absence judgment for voice packets that constitute a queue and the insertion of a complementary packet PP can precede the other processing. That is, since they can be processed when the load of a processor is low, the operating ratio of the processor can be improved.

Further, generally, there is the possibility that the insertion of the complementary packet PP will lower the quality of the decoded voice output. Therefore, it is desirable not to insert the complementary packet PP, if possible. As described in the problem that the invention intends to solve, the packet is inserted only when the queue length becomes zero in the case where it is inserted only into the top position, and therefore it can be said that this is a method for reducing the insertion frequency of the complementary packet PP as much as possible.

On the other hand, in this embodiment, the complementary packet PP is inserted when the queue length becomes less than the lower threshold TL1 that is not zero, and therefore the possibility that the insertion frequency will rise is high, and, according to circumstances, there is a possibility of inserting the complementary packet PP that should not be inserted.

However, in this embodiment, since the complementary packet PP is inserted so as to be dispersed while selecting the insertion position thereof even if the insertion frequency thereof is high, a deterioration in the quality of the decoded voice output caused by the insertion is very slight if any, and it is possible to prevent a marked deterioration in quality that is caused when the complementary packets PP are continuously inserted, for example.

Preferably, in this embodiment, the lower threshold TL1 is set at as low a position as possible (i.e., near the top position), in order not to insert the complementary packet PP as much as possible. However, it is advantageous to set the lower threshold TL1 at as high a position as possible, in order to insert the packet to be dispersed while selecting an optimum insertion position.

If the queue length continues to be in a state of being below the lower threshold TL1 over a plurality of periods of decoding unit time, a plurality of complementary packets PP must be inserted for a queue whose length is less than 7 packets (at this time, the queue length is shortened by one packet for a lapse of one period of decoding unit time) even if one complementary packet PP is inserted during one period of decoding unit time. Therefore, in this embodiment, there is the possibility that, after all, the complementary packets PP are continuously inserted or necessarily inserted into the interval of voice presence. However, according to this embodiment, it is possible to reduce the occurrence frequency of the successive insertions or the insertion into the interval of voice presence.

Generally, in a device for decoding a voice by the packet unit, a packet must be decoded at intervals of a fixed decoding unit time. However, according to this embodiment, a voice presence/absence judgment for a packet and the insertion of a packet can precede other processing. That is, since they can be processed when the load of a processor is low, the operating ratio of the processor can be improved.

(E-2) Effect of the Fifth Embodiment

According to this embodiment, the same effect as that of the first embodiment can be obtained.

In addition, according to this embodiment, it is possible to reduce the occurrence frequency of the continuous insertion of complementary packets (PP) or the insertion into the interval of voice presence, and therefore the possibility of considerably lowering the quality of the decoded voice output can be reduced.

(F) Other Embodiments

The characterizing parts of the first through fifth embodiments can be variously combined.

For example, the lower threshold TL1 that is set at a higher position than the top position, which is a feature of the fifth embodiment, can be combined with not only the first embodiment but also the second through fourth embodiments.

Further, although the lower threshold TL1 is fixed in the fifth embodiment, the lower threshold TL1 may be dynamically changed like the higher threshold TH1 of the third embodiment or like the higher threshold TH2 of the fourth embodiment.

In the first through fifth embodiments, data that corresponds to a conversational voice is contained in a voice packet (e.g., PI). However, the present invention can be applied to a case where a voice packet containing data that corresponds to a voice of music, for example, is transmitted mono-directionally.

Further, the higher threshold TH mentioned above is set at the position that corresponds to the queue length in the middle of 100 packets and 99 packets. However, in actual arrangement, the higher threshold TH will be often set at a position of about 30 packets. It is noted that the actual capacity of the buffer memory 32 will be often set at about 200 packets.

As described above, according to the present invention, an examination is made of vocal properties kept by the sequence of voice information that is contained by a plurality of voice packets that constitute a queue stored in a buffer memory, and, based on an examination result, processing is applied to the queue. Therefore, the quality of voice packet communications to be obtained can be improved.

What is claimed is:

1. A quality control device for voice packet communications for transmitting voice packets through a quality non-assurance type network, the device comprising:

a buffer memory for temporarily storing voice packets received through the network and forming a queue of the received voice packets;

queue operating means for operating the queue in accordance with an operation control signal to be supplied, said queue operating means including a deletion operation portion for deleting from the queue voice packets having like-voice absence properties, being dispersed onto the queue which correspond to an operation position on the queue according to an operation position specifying signal being supplied;

sequence examining means for examining like voice-absence properties of a sequence of voice information contained in a plurality of voice packets that constitute the queue stored in the buffer memory;

operation control means for charging the operation control signal in accordance with an examination result of the sequence examining means, said operation control means including an operation position determining portion for determining an operation position corresponding to voice packets having like-voice absence properties, being dispersed onto the queue and outputting said operation position specifying signal as said operation control signal by the use of an examination result of the sequence examining means;

increase/decrease tendency detecting means for detecting an increase and decrease tendency of a frequency in which a large and small relationship between voice power on a voice reception path and voice power on a voice transmission path changes per unit time by detecting voice power for a voice signal on the voice reception path corresponding to a transmission direction of a voice packet that constitutes the queue and a voice signal on the voice transmission path opposite to the direction where a voice is received;

threshold managing means for managing an upper limit threshold set at least on an upper limit side with respect to a length of the queue; and second upper limit threshold changing means for changing an upper limit threshold in accordance with an increase and decrease tendency detected by the increase/decrease tendency detecting means.

2. A quality control device for voice packet communications for transmitting voice packets through a quality non-assurance type network, the device comprising:

a buffer memory for temporarily storing voice packets received through the network and forming a queue of the received voice packets;

queue operating means for operating the queue in accordance with an operation control signal to be supplied, said queue operating means including a deletion operation portion for deleting from the queue voice packets having like-voice absence properties, being dispersed onto the queue which correspond to an operation position on the queue according to an operation position specifying signal being supplied;

sequence examining means for examining like voice-absence properties of a sequence of voice information contained in a plurality of voice packets that constitute the queue stored in the buffer memory;

operation control means for changing the operation in accordance with an examination result of the sequence examining means, said operation control means including an operation position determining portion for determining an operation position corresponding to voice packets having like-voice absence properties, being dispersed onto the queue and outputting said operation position specifying signal as said operation control signal by the use of an examination result of the sequence examining means;

dual-talk duration extension/contraction tendency detecting means for detecting an extension/contraction tendency of a length of dual-talk duration during which both the voice signal on the voice reception path and the voice signal on the voice transmission path reach a state of voice presence by making a voice presence/absence judgement for a voice signal on a voice reception path corresponding to a transmission direction of a voice packet that constitutes the queue and a voice signal on a voice transmission path opposite to the direction where a voice is received;

threshold managing means for managing an upper limit threshold set at least on an upper limit side with respect to a length of the queue;

first upper limit threshold changing means for changing the upper limit threshold; and queue length monitoring means for monitoring a relationship between a length of the queue and an upper limit threshold;

wherein the first upper limit threshold changing means lowers the upper limit threshold when a tendency that the dual-talk duration extends is detected by the dual-talk duration extension/contraction tendency detecting means, and the first upper limit threshold changing means raises the upper limit threshold when a tendency that the dual-talk duration contracts is detected by the dual-talk duration extension/contraction tendency detecting means.

3. A quality control device for voice packet communications for transmitting voice packets through a quality non-assurance type network, the device comprising:

a buffer memory for temporarily storing voice packets received through the network and forming a queue of the received voice packets;

queue operating means for operating the queue in accordance with an operation control signal to be supplied, said queue operating means including a deletion operation portion for deleting from the queue voice packets having like-voice absence properties, being dispersed onto the queue which correspond to an operation position on the queue according to an operation position specifying signal being supplied;

sequence examining means for examining like voice-absence properties of a sequence of voice information contained in a plurality of voice packets that constitute the queue stored in the buffer memory;

operation control means for changing the operation control signal in accordance with an examination result of the sequence examining means, said operation control means including an operation position determining portion for determining an operation position corresponding to voice packets having like-voice absence properties, being dispersed onto the queue and outputting said operation position specifying signal as said operation control signal by the use of an examination result of the sequence examining means;

increase/decrease tendency detecting means for detecting an increase and decrease tendency of a frequency in which a large and small relationship between voice power on a voice reception path and voice power on a voice transmission path changes per unit time by detecting voice power for a voice signal on the voice reception path corresponding to a transmission direction of a voice packet that constitutes the queue and a voice signal on the voice transmission path opposite to the direction where a voice is received;

threshold managing means for managing an upper limit threshold set at least on an upper limit side with respect to a length of the queue; and second upper limit threshold changing means for lowering an upper limit threshold when an increase tendency exists in a count value outputted by the increase/decrease tendency detecting means that outputs a positive value when a power at the decoder's side is large, outputs a negative value when the power at the decoder's side is small, and counts zero-cross times of the output value, said second upper limit threshold changing means raising the upper limit threshold when a decrease tendency exists in the count value output by the increase/decrease tendency detecting means.

* * * * *